May 22, 1934.  J. F. FERM  1,959,756
COLUMNAR STRUCTURE
Filed Aug. 19, 1931    3 Sheets-Sheet 1
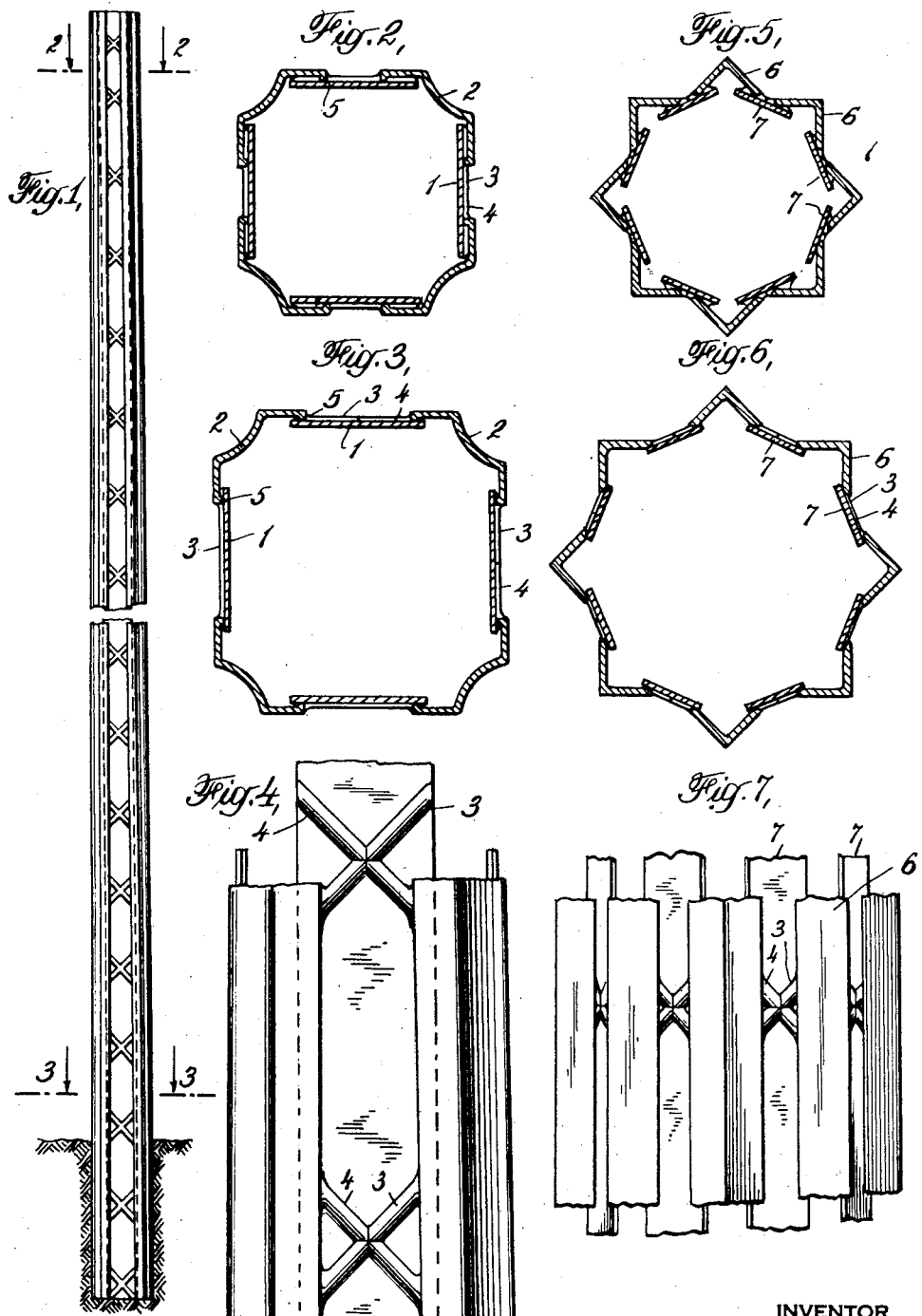
INVENTOR
John F. Ferm
BY
ATTORNEYS

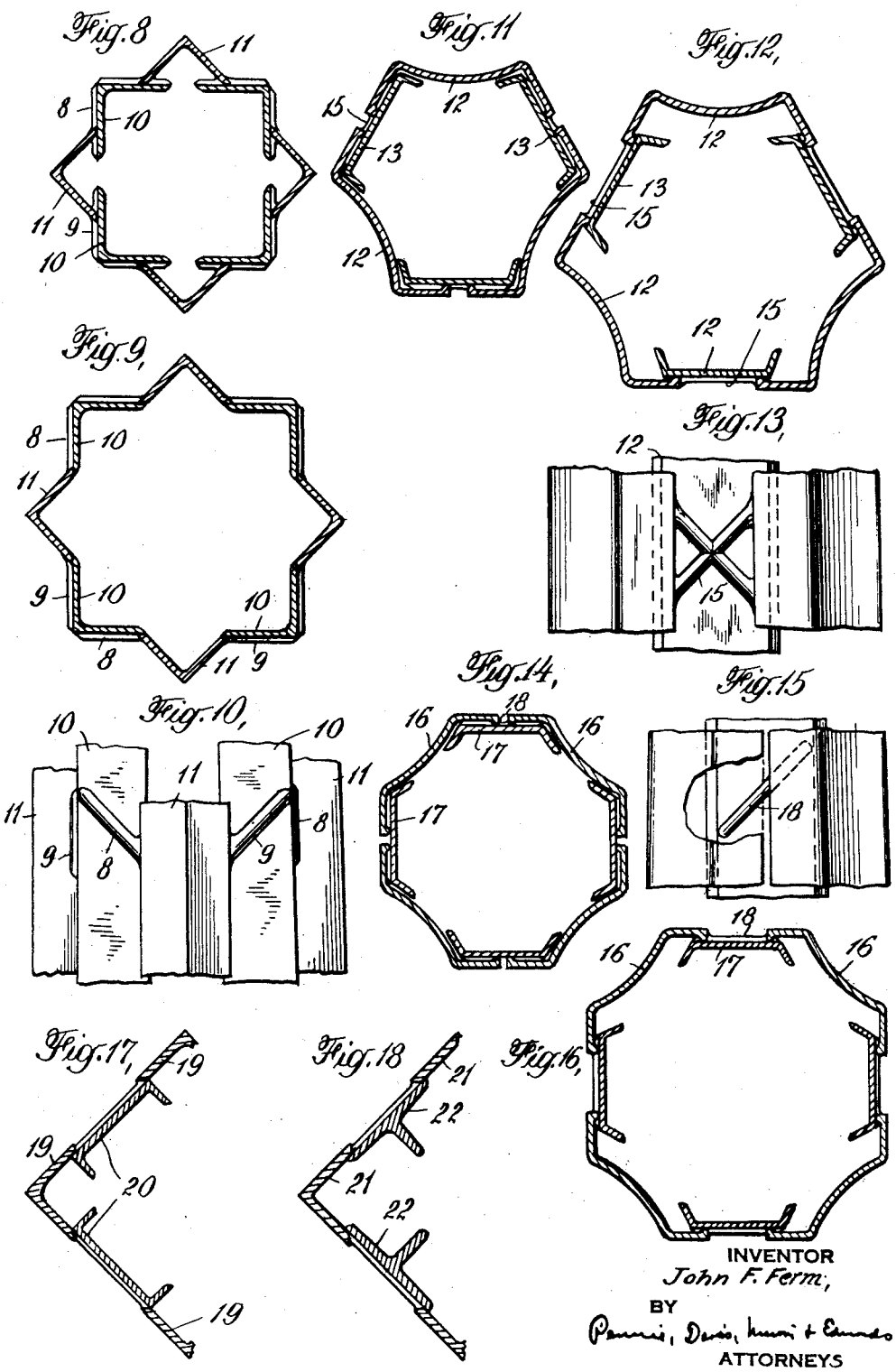

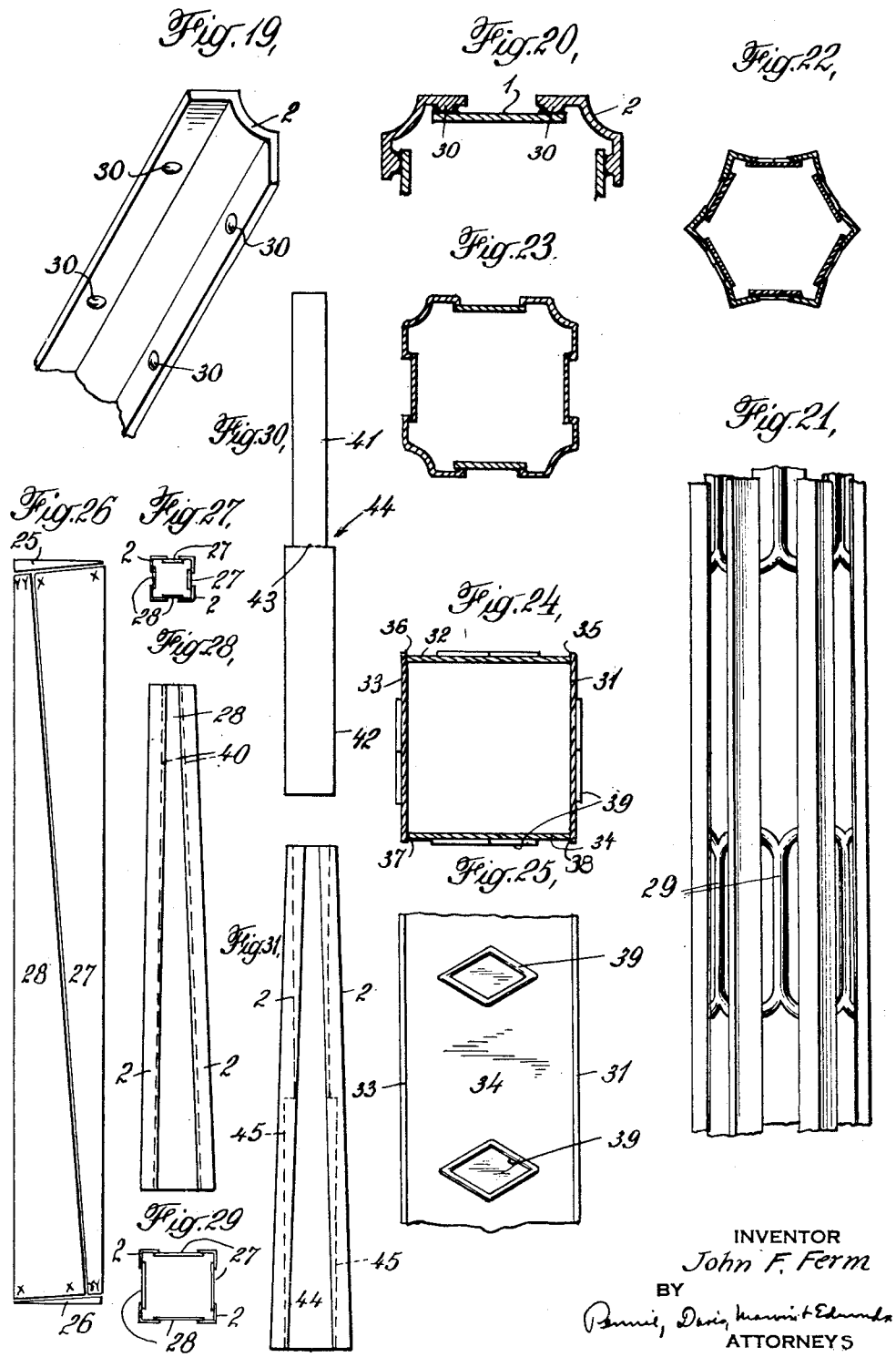

Patented May 22, 1934

1,959,756

UNITED STATES PATENT OFFICE 1,959,756

COLUMNAR STRUCTURE

John Ferdinand Ferm, Midland, Pa., assignor to Pittsburgh Crucible Steel Company, a corporation of Pennsylvania Application August 19, 1931, Serial No. 558,054

16 Claims. (Cl. 189—25)

This invention pertains to metal columnar structures and more especially to metal poles of hollow or tubular configuration.

An object of the invention is to provide a metal pole or post of the type referred to, which combines in a structure of attractive design and pleasing appearance, the features of great strength, lightness in weight, facility and economy of construction.

Although the pole of this invention finds utility under any conditions calling for the above requisites, it is particularly applicable as a support for overhead electrical power transmission or communication lines, as a sign or signal post, or as a lighting standard along thoroughfares.

The pole described herein is characterized in being formed of a number of structural members such as angle bars, channel sections, T bars, flat strips and the like, disposed about a common axis, with adjacent members contacting and welded together along longitudinal portions, providing thereby a resultant integral structure of closed hollow configuration.

Any single structural shape or combination of shapes may be employed in a pole of given design. By suitably selecting and combining shapes in the manner pointed out below, a great variety of pleasing effects can be obtained by employment of standard structural shapes. The pole may be made of any rectangular or other desired polygonal contour, and decorated by patterns of longitudinal fluting attained by virtue of the configuration, combination and arrangement of the individual structural members.

By way of added decoration, transversely extending ribs or other raised figures may be rolled or otherwise formed upon the, preferably alternate, members.

By extending the ribs or raised portions, between contiguous surfaces of the finished pole, a means is attained for the employment of electric-resistance welding between members. The raised portions provide contact points of high resistance which serve to heat the metal rapidly to fusibility during the incipient stages of the welding process. Thereafter applied pressure forces contiguous surfaces into continuous contact, whereupon the flow of current between all points of the contacting surfaces seals adjacent members together along their longitudinal portions, providing thereby a water-tight and rust-resistant joint. This construction constitutes another object of the invention. The means thus utilized for preventing the entrance of moisture between surfaces, eliminates corrosion which otherwise might ultimately bring about a collapse of the structure through disintegration of parts.

The poles can be made of uniform sectional dimensions throughout, or may if desired be tapered. In all of the various modifications, tapering is quite simply accomplished by causing certain of the members variably to overlap others throughout their longitudinal extent in such fashion that the overlap is greater at the top than at the bottom. In this way a tapered pole may be formed of structural shapes which are individually of uniform cross-sectional dimensions throughout.

In modifications of the pole which make use of flat strips, a taper may be attained by varying the width of the strips from top to bottom. If the strips alternate with other structural shapes the latter may be of uniform sectional dimensions.

The totally closed feature wherein the pole presents a solid appearance viewed in elevation is in contrast with the majority of poles formed of structural shapes which are of latticed or skeleton appearance. This feature permits certain advantages in design not attainable with the latticed or skeleton type of pole.

By forming a closed hollow pole of structural sections in accordance with this invention, a great saving in dead weight is attained as compared to hollow poles of equal strength made of cast iron. It is in fact doubtful if a cast iron pole of any economical proportions could compete in the matter of strength with the pole of this invention which, in the usual case, will be made of rolled steel structural sections. The well understood toughness and ruggedness of such structural shapes needs no comment.

These and other objects of the invention will best be understood from the following detailed explanation made with reference to the accompanying drawings of which:

Fig. 1 shows in side elevation a tapered pole in accordance with this invention;

Figs. 2–4 inc. show in detail the construction of the pole of Fig. 1. Figs. 2 and 3 show sectional views taken along the lines 2—2 and 3—3 of Fig. 1; while Fig. 4 is a view in side elevation of a fragmentary portion of the pole with parts broken away to reveal the method of construction.

Figs. 5–7 inc., 8–10 inc., 11–13 inc., and 14–16 inc., are drawings, corresponding respectively to Figs. 2–4 of modified forms of the invention.

Figs. 17 and 18 are partial sectional views of still other modifications.

In Figs. 1–18 inc. the members are provided with transversely extending ribs to facilitate electric resistance welding. Figs. 19 and 20 are fragmentary views of a construction disclosing the use of semi-spherical knobs or buttons to this end.

Figs. 21–23 inc. disclose a construction in accordance with Figs. 1–18 inc. wherein the ribs are varied in shape to the ends of added decorativeness in the finished pole.

Figs. 24 and 25 show a pole formed entirely of flat strips welded together.

Figs. 26–31 inc. show various means for obtaining a tapered pole employing flat strips, in addition to the means disclosed in Figs. 1–4 inc. Fig. 28 is a view in side elevation of a finished pole utilizing tapered strips in accordance with Fig. 26. Views in end elevation at the top and bottom of the pole of Fig. 28 are represented in Figs. 27 and 29 respectively. Fig. 31 is a view in side elevation of a pole embodying the flat strip construction of Fig. 30.

Referring to Figs. 1–4 inc. the pole comprises the longitudinally extending flat strips 1 and the stiffened bars 2 of fluted angle section, disposed in alternate sequence about a common axis. The adjacent members 1 and 2 are positioned in contact along longitudinal portions as shown, and are moreover welded together preferably by the method of electric-resistance welding.

To this end certain of the members, in this instance the flat strips 1, have rolled or otherwise formed on their outer surfaces, the longitudinally spaced transversely extending ribs 3 and 4. In this modification the ribs 3 and 4 cross one another to form X's. The angle bars 2 terminate at their longitudinal edges in small flanges 5 which, prior to welding, rest against the ribs 3 and 4, providing thereby contact points of high electrical resistance between the members 1 and 2.

Welding is accomplished by passage of an electrical current between the contacting members 1 and 2 while applying pressure thereto. The high contact resistance between members causes the metal to heat rapidly to fusibility at points where the ribs 3 and 4 contact with the flanges 5. While the metal is thus maintained in a plastic state, the pressure exerted forces the flanges 5 of the channel members 2 into continuous contact with the outer surfaces of the flat strips 1.

During the incipient stages of welding the electrical current flows exclusively through the ribs in its passage between contacting members. Subsequently, however, when, due to the applied pressure, the flange 5 of a channel member 2 is forced flush with the outer surface of the associated flat strip 1, the flow of current is no longer restricted to the ribs 3 and 4, but occurs in varying degree along the path of contact between the ribs. This has the effect of welding the parts not only at the ribs, but on both sides thereof.

This welding between ribs in conjunction with the applied pressure may be carried to the point of completely sealing the joints between members against the entrance of moisture throughout the longitudinal extent of the joints. In this way each joint is made water-tight and hence rust-proof. Consequent corrosion and disintegration of the pole are eliminated. The usual riveted or welded connections do not attain this desirable result.

The finished pole, as seen from the drawings, is of entirely closed construction viewed in elevation. The modification of Figs. 1–4 inc. is of rectangular sectional contour, and is provided with longitudinal flutings at the corners as a result of the concave curvature of the angle bars 2.

It will be noted from a comparison of the sectional views, Figs. 2 and 3, taken at the top and bottom respectively of the pole of Fig. 1, that the amount by which the channel members 2 overlap the flat strips 1 is considerably greater at the top of the pole than at the bottom. This has the effect of giving a desired taper to the finished pole as indicated in Fig. 1.

The attainment of a taper in this fashion represents an economy in manufacture by reason of the fact that the individual structural shapes are of uniform sectional dimensions throughout, with the result that the same stock is suitable for all pole lengths and degrees of taper.

It is, however, not intended to limit the invention to the attainment of a taper in this fashion. It may become advantageous, particularly where an extreme degree of taper is desired, to vary the sectional dimensions of certain of the structural shapes throughout their longitudinal extent. Such result could be attained for example in the pole of Figs. 1–4, by making the flat strips 1 in the form of trapeziums rather than rectangular, considered in side elevation.

The employment of tapered or trapezium shaped flat strips for the members 1 in the pole of Figs. 1–4, provides a tapered pole construction wherein the overlap between members 1 and 2 is substantially constant throughout the length of the structure. In this case the variation in width of the flat strips provides the required taper in the resulting structure, the fluted angle members 2 of course retaining their constancy of sectional area throughout.

An economical means of securing the tapered strips is shown in Fig. 26. Starting with a larger flat strip of rectangular configuration, a parallelogram is formed by trimming off equal triangular members 25 and 26 at the ends. The parallelogram is then cut diagonally throughout its longitudinal extent to provide the similar tapered members 27 and 28. The triangular portions 25 and 26 are cut off at such an angle that in the tapered members 27 and 28 ultimately attained, the angles X are all equal to each other as are all of the angles Y.

The widths at top and bottom of the members 27 and 28 determine the taper of the resulting pole. It is understood of course that in forming a pole such as that in Figs. 1–4, from angle bars 2 and flat strips such as 27 and 28 (Fig. 26), the latter must all be arranged with their wider portions at the base and their narrower portions at the top of the pole.

Figs. 27–29 inc. show a pole embodying the tapered strips of Fig. 26. It will be seen from the views in end elevation at the top and bottom of the pole Figs. 27 and 29, and from the dotted lines 40 Fig. 28, that the angle bars 2 overlap the tapered strips 27, 28 by a constant amount throughout the longitudinal extent of the structure. This is in contrast with the variable overlap depicted in the construction of Figs. 2–4.

In addition to the methods described, the tapered pole of Fig. 1 could be formed by making each of the flat strips 1 of two or more pieces of different uniform widths, butt-welded to provide single strips of echelon contour.

This construction is shown in Figs. 30 and 31. The flat strips 44 are, in this instance, each formed of two members 41 and 42 (Fig. 30) of different uniform widths butt-welded together at 43. Referring now to Fig. 31 the angle bars 2 are caused to overlap the stepped portion of the flat strips 44 in the manner indicated to obtain the tapered pole construction. The dotted lines 45 show the amount of overlap at any given elevation.

The structure shown in Figs. 5-7 inc. differs from that of Figs. 1-4 primarily in the matter of appearance. It is similarly fabricated of structural shapes consisting in this instance of angle bars 6 alternating with flat strips 7 symmetrically disposed about a common axis, with adjacent members contacting and welded together along longitudinal edges. The angle bars 6 variably overlap the flat strips 7 in order to provide the desired taper to the finished pole in the manner indicated in Figs. 2-4. Welding is accomplished as before by the provision of the spaced ribs 3 and 4.

In appearance, the pole of Figs. 5-7 is quite different from that of Fig. 1, presenting as it does an array of equally spaced longitudinal flutings viewed in elevation. The simple but dignified design of each type of pole, however, has considerable aesthetic appeal. The crossed ribs 3 and 4 add to the decorativeness of the pole of Figs. 5-7 just as they do in the case of the pole of Fig. 1.

The modification shown in Figs. 8-10 inc. is formed entirely of angle bars 10 and 11 positioned in longitudinal contact with their vertices directed outwardly. The general features of construction are the same as for previous modifications, the taper being attained by variable overlap, and the electric-resistance welding accomplished in the manner described. In this modification single ribs 8 and 9 extend diagonally across both outer surfaces of the alternate angle bars 10. This arrangement is in contrast to the cross-ribbed modification of Figs. 1-7 inc. Either arrangement is, of course, equally effective from the standpoint both of appearance and utility.

Figs. 11-13 inc. and 14-16 inc. disclose the features of poles formed exclusively of channel sections. The pole of Figs. 11-13 is of hexagonal contour and comprises longitudinally fluted channel members 12 positioned to overlap standard types of channel sections. The completely exposed fluted channel members 12 are of slightly modified construction, being provided with a concave curvature to add to the appearance of the pole. This pole employs the crossed-ribs 15 of the pole of Fig. 1.

The pole of Figs. 14-16 comprises the modified channel members 16 overlapping the standard channel shapes 17 to provide a resultant pole of octagonal contour. In this modification the single ribs 18 are employed.

Fig. 17 is a partial sectional view of a pole formed of alternately positioned angle bars 19 and channel sections 20 welded together. The Fig. 18 modification is a similar sectional view wherein the pole is formed of alternately positioned angle bars 21 and T bars 22.

Figs. 21, 22 and 23 show constructions similar to those set forth in Figs. 2-4 and 5-7 respectively except for the shapes of the welding ribs employed. Whereas in Figs. 2-4 and 5-7 the ribs 3, 4 are intersecting straight lines forming simple X's, in Figs. 21, 22 and 23 the intersections of the ribs 29 are elongated in the longitudinal direction as shown. This modification not only adds to the decorativeness of the pole, but furnishes a means of properly spacing adjacent welds. The drawings are of course merely suggestive of the many variations in decorative effects that may be obtained.

The ribs may be dispensed with as a means of providing resistance welding. In their stead certain of the structural members may have semi-spherical knobs or buttons rolled or otherwise formed thereon at intervals along contacting surfaces. This construction is shown in Figs. 19 and 20 which are fragmentary portions of a pole in accordance with Figs. 1-4.

In this instance referring to Fig. 19, the buttons 30 are formed upon the inner surfaces of the fluted angle members 2. As shown in Fig. 20 the buttons 30 formed upon members 2 contact with the flat strips 1 in order to initiate the weld. This modification is particularly applicable where overlapping parts of adjacent members are parallel plane surfaces.

The longitudinal spacings between the knobs or ribs is preferably such that the unsupported lengths of the individual members between the adjacent welds will maintain loads approximating the ultimate strength of the material employed. That is, the welds are so spaced that the sections of the individual members between welding points will fail in pure compression rather than by columnar action. It has been found that the maximum spacing for which this condition holds approximately is that attained for a slenderness ratio of about 40 for the individual structural members. The slenderness ratio is, of course, defined as the ratio of the unsupported length of the member to its least radius of gyration.

In the structures described the unsupported lengths of the individual members are not equal exactly to the spacing between ribs due to the fact, pointed out above that, some welding between members occurs in the regions between the ribs. The longitudinal distances from the ribs to which the welding is thus effective is difficult to forecast in a given instance, and hence in general is not taken into account in the design. It does, however, increase the strength of the structure and thus adds to the factor of safety.

The above rule as to the spacing of the ribs does not apply to all members of some structures. For structures not required to carry heavy loads the spacing is based on the slenderness ratio for half the members forming the column as for example in the structure of Figs. 1-4 inc. Here the welding spacing is approximately determined by a slenderness ratio of forty only for the outside fluted angle members 2.

For structures intended to carry heavy loads as for example those of Figs. 8-16 inc., the weld spacing applies to all members, as all of the individual members are of sectional shapes suitable as compression members, such as channels, angles, T bars, etc., all of which have a comparatively large slenderness ratio. As a result the weld spacing will still be relatively great thereby assuring a pole which is strong yet light in weight.

It is, of course, not necessary to employ electric resistance welding in fabricating the poles. Gas or electric arc welding is equally applicable. Where either of the latter methods of welding is utilized, the raised ribs are not necessary and may be omitted unless desired for purposes of appearance.

Also electric resistance welding without the use of raised ribs may be employed. Such welds are made by machines developing enormous pressures, the same as are used in spot welding plates.

Figs. 24 and 25 disclose a rectangular pole formed without the employment of the welding ribs. The pole is formed of flat strips 31, 32, 33 and 34 welded together along contacting portions 36-38 inc. Decorativeness may be obtained by means of the figures 39 formed upon the members during the rolling operation or otherwise.

A tapered pole of the construction shown in Figs. 24 and 25 could be made by welding together along their longitudinal edges four tapered strips such as 27 and 28 of Fig. 26.

Where the ribbed construction is employed the ribs may of course be spaced according to requirements of strength, ornamental appearance or for producing an entirely sealed pole i. e. a pole wherein all joints are welded so as to be watertight and non-corrosive or even gas tight if required. To this latter end it may be necessary to employ sealing strips of steel along the joints. Such strips would be inserted in parts of the pole where contact welding and sealing are desired.

I claim:

1. A metal pole or post of closed hollow configuration formed of longitudinally extending structural members disposed with adjacent members contacting along longitudinal surfaces, certain of said contacting surfaces having longitudinally spaced ornamental projections formed thereon, said projections extending between said contacting surfaces to facilitate electric resistance welding, said contacting members being welded together to provide a resultant integral structure, and certain of said members being arranged variably to overlap others for imparting taper to said pole.

2. A metal pole or post of closed hollow configuration formed of longitudinally extending stiffened members and flat strips disposed with adjacent members contacting along longitudinal surfaces, certain of said contacting surfaces being provided initially with longitudinally spaced raised knobs to facilitate electric-resistance welding, said contacting members being welded together to provide a resultant integral structure, and certain of said members being arranged variably to overlap others for imparting taper to said pole.

3. A metal pole or post or closed hollow configuration formed of longitudinally extending structural members disposed with adjacent members contacting along longitudinal surfaces, certain of said members being provided with longitudinally spaced transversely extending ribs serving to decorate said pole and to facilitate electric resistance welding by providing initially high resistance contact points along the contacting surfaces between said members, said contacting members being welded together to provide a resultant integral structure, and certain of said members being arranged variably to overlap others for imparting taper to said pole.

4. A metal pole or post of closed hollow configuration formed of longitudinally extending structural members, each of uniform sectional dimensions and configuration throughout, disposed with adjacent members contacting and welded together along longitudinal surfaces, forming thereby a resultant integral structure, said pole being formed with a taper by variably overlapping certain of said members with those adjacent along said contacting surfaces.

5. A metal pole or post of closed hollow configuration formed of longitudinally extending stiffened bars and flat strips, disposed in alternate sequence with adjacent members contacting and welded together along longitudinal portions, said pole being formed with a taper by variably overlapping said flat strips by said stiffened bars.

6. A metal pole or post of closed hollow configuration formed of longitudinally extending stiffened bars and flat strips disposed in alternate sequence about a common axis, adjacent members being positioned in contact and welded together along longitudinal surfaces, forming thereby a resultant integral structure, said pole being formed with a taper by the employment of flat strips each made up of sections of different uniform widths butt-welded together to form a single strip of echelon contour, said stiffened bars being arranged to variably overlap the stepped portions of said strips.

7. A metal pole or post of closed hollow configuration formed of longitudinally extending structural members, including members of echelon contour, disposed with adjacent members contacting and welded together along longitudinal portions, forming thereby a resultant integral structure, certain of said members being arranged to overlap the stepped portions of said echelon members for imparting taper to said pole.

8. A metal pole or post of closed hollow configuration formed of longitudinally extending stiffened members alternating with flat strip members of echelon contour, disposed with adjacent members contacting and welded together along longitudinal portions, forming thereby a resultant integral structure, said stiffened members being arranged variably to overlap the stepped portions of said strips for imparting taper to said pole.

9. A metal pole or post of closed hollow configuration formed of longitudinally extending stiffened members, each of uniform sectional dimensions and configuration throughout, alternating with members of echelon contour, the members adjacent being positioned in contact and welded together along longitudinal surfaces, forming thereby a resultant integral structure, said pole being formed with a taper by providing an overlap between said members of uniform section and the stepped portions of said members of echelon contour.

10. A metal pole or post of closed hollow configuration formed of longitudinally extending flanged bars disposed with adjacent bars contacting and welded together along longitudinal portions, forming thereby a resultant integral structure, certain of said bars being arranged variably to overlap others for imparting taper to said pole.

11. A metal pole or post of closed hollow configuration formed of longitudinally extending members comprising flanged bars alternating with flat strips disposed with adjacent members contacting and welded together along longitudinal portions, forming thereby a resultant integral structure, certain of said members being arranged variably to overlap others for imparting taper to said pole.

12. A metal pole or post of closed hollow configuration formed of structural members disposed in sequence about a common axis, with adjacent members joined by lap-welding along longitudinal surfaces, forming thereby an integral structure, certain of said surfaces being provided initially with longitudinally spaced embossments to facilitate electric resistance welding, whereby said pole presents no exposed flanges or welding material.

13. A metal pole or post of closed hollow configuration formed of structural members disposed in sequence about a common axis, with adjacent members joined by lap-welding along longitudinal surfaces, forming thereby an integral structure, certain of said members being provided with longitudinally spaced transverse ribs to facilitate electric resistance welding, whereby said pole presents no exposed flanges or welding material.

14. A metal pole or post of closed hollow configuration formed of structural members disposed in sequence about a common axis, with adjacent members joined by lap-welding along longitudinal surfaces, forming thereby an integral structure, certain of said members being provided with embossments for ornamentation and to facilitate electric resistance welding of contacting surfaces, whereby said pole presents no exposed flanges or welding material.

15. A metal pole or post of closed hollow configuration formed of structural members disposed in sequence about a common axis, with adjacent members joined by lap-welding along longitudinal surfaces, certain of said members being adapted variably to overlap others for imparting taper to said pole.

16. A metal pole or post of closed hollow configuration formed of structural members, each of uniform section and configuration throughout, disposed in sequence about a common axis, with adjacent members joined by lap-welding along longitudinal surfaces, certain of said members being adapted variably to overlap others for imparting taper to said pole.

JOHN FERDINAND FERM.